No. 634,287. Patented Oct. 3, 1899.
H. DEPTNER.
CARVING DEVICE.
(Application filed July 7, 1898.)
(No Model.)
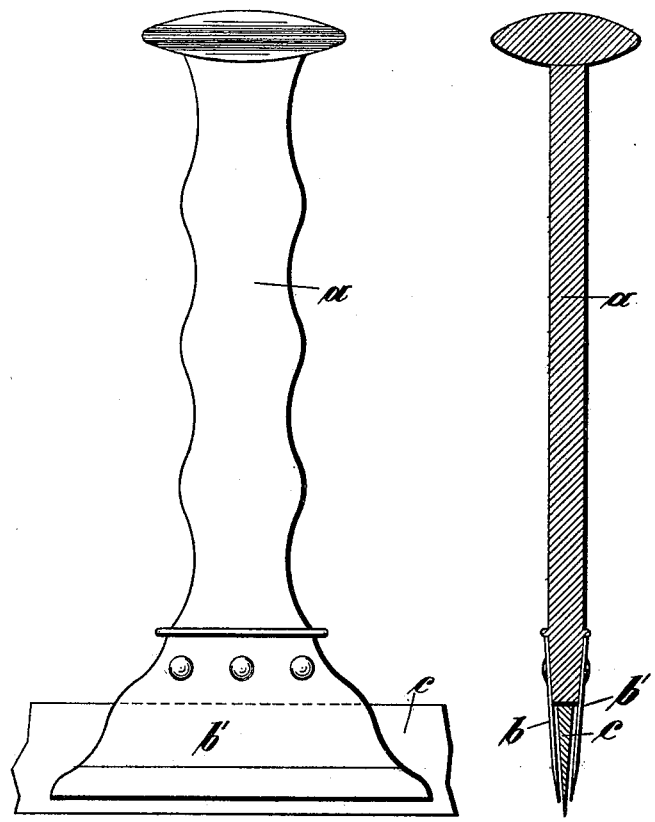
Witnesses:
G.S. Noble.
J. Buehler.
Inventor,
Hugo Deptner
by B. Singer.
Att'y

UNITED STATES PATENT OFFICE.

HUGO DEPTNER, OF DETTA, AUSTRIA-HUNGARY.

CARVING DEVICE.

SPECIFICATION forming part of Letters Patent No. 634,287, dated October 3, 1899.

Application filed July 7, 1898. Serial No. 685,359. (No model.)

*To all whom it may concern:*

Be it known that I, HUGO DEPTNER, a subject of the Emperor of Austria-Hungary, residing at Detta, Austria-Hungary, have invented certain new and useful Improvements in Carving-Tools, of which the following is a full, clear, and exact description.

My invention relates to a device used for carving and cutting up meat, poultry, or game intermixed with bones and by the employment of which such meat can be cut up easier and quicker than has been possible by employing a carving-knife alone.

In the accompanying drawings, Figure 1 is a front elevation, and Fig. 2 a vertical section through the tool.

$a$ indicates a handle provided with a knob $a'$ at its upper end, which serves as an anvil. The lower end of the handle may be provided with ornaments of any desired kind and terminates in or has secured thereto a sharp wedge-shaped blade $c$. On either side of this blade is a guide-plate $b\ b'$, attached to the handle by riveting or in any other convenient manner, the lower edges of said plates also being sharpened. It will be noted that the blade $c$ is longer than the plates and has its cutting edge below the lower edge of the guide-plates $b\ b'$.

The use of the tool is effected by taking hold of the handle, and when a bone is met in carving the knife $c$ is placed directly above the place where the bone is situated, when the above-mentioned knob is struck with the hand or some instrument, the effect of the stroke being transferred directly upon the back of the blade, driving the same through the bone. The two guide-plates $b\ b'$ prevent the knife or blade from tilting over, and as they also enter the cut of the object being carved they serve to wedge apart the sections formed by the cut.

What I claim, and desire to secure by Letters Patent, is—

1. A device for cutting meat, composed of a suitable handle, the lower end of which terminates in a wedge-shaped cutting-blade, sharpened guide-plates arranged on the sides of said blade and secured to the handle, substantially in the manner and for the purpose set forth.

2. A device for cutting meat, composed of a suitable handle, a wedge-shaped cutting-blade secured to the lower end of said handle, sharpened guide-plates arranged on either side of said blade and parallel therewith, the cutting edges of said guide-plates being above the edge of said blade, substantially as described.

In witness whereof I subscribe my signature in presence of two witnesses.

HUGO DEPTNER.

Witnesses:
  LEIDENBACH JANÓ,
  OLAH VENDER.